US012600666B2

(12) United States Patent
Ni et al.

(10) Patent No.: US 12,600,666 B2
(45) Date of Patent: Apr. 14, 2026

(54) GLASS ARTICLE HAVING AN ANTI-REFLECTIVE COATING

(71) Applicant: PILKINGTON GROUP LIMITED, Lathom (GB)

(72) Inventors: Jun Ni, Maumee, OH (US); Srikanth Varanasi, Ottawa Hills, OH (US)

(73) Assignee: Pilkington Group Limited, Lathom (GB)

( * ) Notice: Subject to any disclaimer, the term of this patent is extended or adjusted under 35 U.S.C. 154(b) by 584 days.

(21) Appl. No.: 17/436,709

(22) PCT Filed: Mar. 13, 2020

(86) PCT No.: PCT/GB2020/050637
§ 371 (c)(1),
(2) Date: Sep. 7, 2021

(87) PCT Pub. No.: WO2020/183190
PCT Pub. Date: Sep. 17, 2020

(65) Prior Publication Data
US 2022/0153635 A1 May 19, 2022

Related U.S. Application Data

(60) Provisional application No. 62/818,285, filed on Mar. 14, 2019.

(51) Int. Cl.
*B32B 15/04* (2006.01)
*B32B 17/06* (2006.01)
(Continued)

(52) U.S. Cl.
CPC .......... *C03C 17/3417* (2013.01); *C03C 3/087* (2013.01); *C03C 2217/734* (2013.01)

(58) Field of Classification Search
CPC ................ C03C 17/3417; C03C 3/087; C03C 2217/734
(Continued)

(56) References Cited

U.S. PATENT DOCUMENTS 5,780,149 A * 7/1998 McCurdy ............ C03C 17/3417
359/359
5,935,716 A * 8/1999 McCurdy ............... G02B 1/115
359/359
(Continued)

FOREIGN PATENT DOCUMENTS

EP          0933654 A2    8/1999
WO     WO 2015/121648 A1    8/2015
(Continued)

OTHER PUBLICATIONS

European Patent Office, International Search Report with Written Opinion, issued in PCT/GB2020/050637, 11 pages, Jun. 15, 2020, European Patent Office, Rijswijk, Netherlands.

*Primary Examiner* — Lauren R Colgan
(74) *Attorney, Agent, or Firm* — Marshall & Melhorn, LLC

(57) ABSTRACT

A glass article includes a glass substrate with a coating formed over the glass substrate. The coating includes a first anti-reflective layer deposited over the glass substrate, the first layer having a refractive index of 1.6 or more and a thickness of less than λ/(4*n). A second anti-reflective layer is deposited over the first anti-reflective layer, the second anti-reflective layer having a thickness that is greater than the thickness of the first anti-reflective layer and a refractive index that is less than the refractive index of the first anti-reflective layer. The glass article exhibits a total visible light reflectance of less than 6.0%.

21 Claims, 2 Drawing Sheets

(51) Int. Cl.
    *C03C 3/087*       (2006.01)
    *C03C 17/34*       (2006.01)

(58) Field of Classification Search
    USPC ......................................................... 428/432
    See application file for complete search history.

(56)               References Cited

U.S. PATENT DOCUMENTS

| | | | | |
|---|---|---|---|---|
| 6,074,730 | A * | 6/2000 | Laird | G02B 1/16 |
| | | | | 359/586 |
| 6,165,598 | A * | 12/2000 | Nelson | C03C 17/3452 |
| | | | | 359/359 |
| 6,924,037 | B1 | 8/2005 | Joret et al. | |
| 9,957,194 | B2 | 5/2018 | Soubeyrand et al. | |
| 10,377,664 | B2 | 8/2019 | Varanasi | |
| 11,124,447 | B2 * | 9/2021 | Varanasi | C03C 17/3417 |
| 11,718,070 | B2 * | 8/2023 | Varanasi | B32B 17/10651 |
| | | | | 428/216 |
| 2013/0316140 | A1 * | 11/2013 | Lu | C03C 17/2453 |
| | | | | 428/432 |
| 2017/0123109 | A1 * | 5/2017 | Varanasi | G02B 1/115 |
| 2017/0204000 | A1 * | 7/2017 | Varanasi | B32B 17/10201 |
| 2019/0351814 | A1 | 11/2019 | Furubayashi et al. | |
| 2020/0123047 | A1 | 4/2020 | Mahoney et al. | |
| 2022/0234334 | A1 * | 7/2022 | Varanasi | B32B 17/10201 |

FOREIGN PATENT DOCUMENTS

| | | | |
|---|---|---|---|
| WO | WO 2016/075435 A1 | 5/2016 | |
| WO | WO-2018185491 A1 * | 10/2018 | ......... C03C 17/3417 |

* cited by examiner

GLASS ARTICLE HAVING AN ANTI-REFLECTIVE COATING

BACKGROUND OF THE INVENTION

The invention relates to coated glass articles. More particularly, the invention relates to a glass article having an anti-reflective coating.

Windows and touch screen electronic devices are often made of glass. Excessive reflection from the glass in a window or a touch screen device may be undesirable. It would be advantageous to provide a glass that exhibits a low visible light reflection and high visible light transmission in order to improve the performance of the window or the readability and usability of the device.

SUMMARY OF THE INVENTION

A glass article includes a glass substrate with a coating formed over the glass substrate. The coating includes a first anti-reflective layer deposited over the glass substrate, the first layer having a refractive index of 1.6 or more and a thickness of less than $\lambda/(4*n)$. A second anti-reflective layer is deposited over the first anti-reflective layer, the second anti-reflective layer having a thickness that is greater than the thickness of the first anti-reflective layer and a refractive index that is less than the refractive index of the first anti-reflective layer. The glass article exhibits a total visible light reflectance of less than 6.0%.

BRIEF DESCRIPTION OF THE DRAWINGS

The above, as well as other advantages of the present invention will become readily apparent to those skilled in the art from the following detailed description when considered in the light of the accompanying drawings in which.

DETAILED DESCRIPTION OF THE INVENTION

Figure 1:
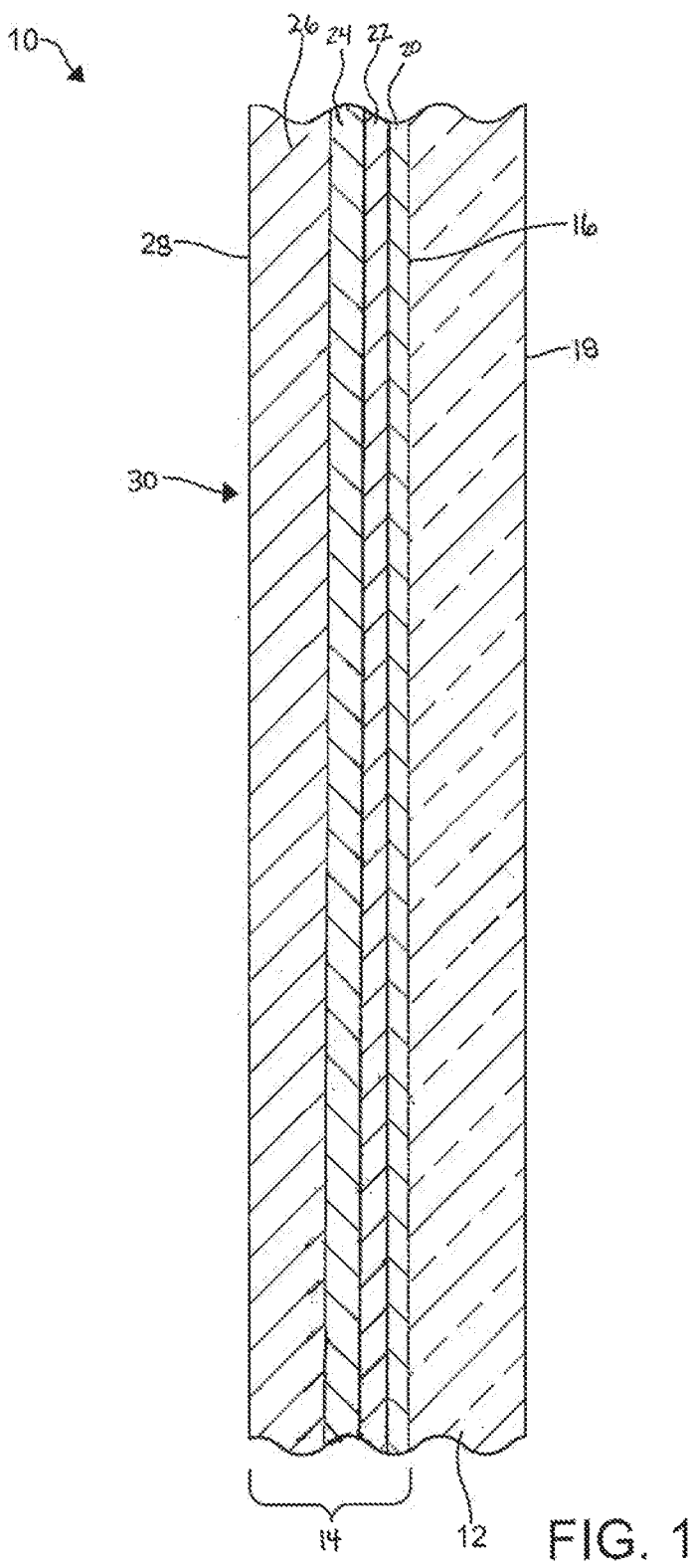
FIG. 1 is a sectional view of an embodiment of a glass article in accordance with the invention.

It is to be understood that the invention may assume various alternative orientations and step sequences, except where expressly specified to the contrary. It is also to be understood that the specific layers, articles, methods and processes illustrated in the attached drawings, and described in the following specification are simply exemplary embodiments of the inventive concepts. Hence, specific dimensions, directions, or other physical characteristics relating to the embodiments disclosed are not to be considered as limiting, unless expressly stated otherwise.

In an embodiment, a glass article 10 is provided. The embodiments of the glass article 10 will be described below and with reference to FIGS. 1-2. The embodiments of the glass article 10 may be utilized as a single glass sheet. In one such embodiment, the glass article 10 is utilized as a portion of a window assembly. In another embodiment, the glass article 10 may be utilized as a display assembly. However, it should be appreciated that the embodiments of the glass article 10 may be utilized in other architectural, electronic, residential, commercial, photovoltaic, automotive, and aerospace applications.

The glass article 10 comprises a glass substrate 12. Embodiments of the glass substrate 12 are illustrated in, for example, FIGS. 1 and 2. The thickness of the glass substrate 12 may vary between embodiments. In some embodiments, the glass substrate 12 is not limited to a particular thickness. However, in certain embodiments, the glass substrate 12 may have a thickness of 20.0 millimeters (mm) or less. Preferably, the glass substrate 12 may have a thickness of 0.5-20.0 mm. In some embodiments, the glass substrate 12 may have a thickness of 2.0-20.0 mm.

The transparency or absorption characteristics of the glass substrate 12 may vary between embodiments of the glass article 10. For example, in some embodiments, the glass substrate 12 is clear. In embodiments where the glass substrate 12 is clear, the glass substrate 12 may exhibit a total visible light reflectance (Illuminant D65, ten degree observer) of between 7.0% and 9.0%. In other embodiments, it may be preferable that the glass substrate 12 have a low iron content, which allows the glass substrate 12 to exhibit a high visible light transmittance. In some embodiments, the glass substrate 12 may comprise 0.15 weight % $Fe_2O_3$ (total iron) or less. As used herein, the phrase "total iron" refers to the total weight of iron oxide ($FeO+Fe_2O_3$) contained in the glass. More preferably, the glass substrate 12 comprises 0.1 weight % $Fe_2O_3$ (total iron) or less, and, even more preferably, a 0.02 weight % $Fe_2O_3$ (total iron) or less. In an embodiment, the glass substrate 12 may comprise 0.012 weight % $Fe_2O_3$ (total iron). In these embodiments, the glass substrate 12 may exhibit a total visible light transmittance of 91% or more in the CIELAB color scale system (Illuminant C, 10 degree observer). Further, the color of the glass substrate 12 can vary between embodiments. In an embodiment, the glass substrate 12 may be substantially clear. In still other embodiments, the glass substrate 12 may be tinted or colored.

The glass substrate 12 may be of a conventional glass composition known in the art. However, it is preferred that the glass substrate 12 is a soda-lime-silica glass. When the glass substrate 12 is a soda-lime-silica glass, the glass substrate 12 may comprise 68-74 weight % $SiO_2$, 0-3 weight % $Al_2O_3$, 0-6 weight % MgO, 5-14 weight % CaO, 10-16 weight % $Na_2O$, 0-2 weight % $SO_3$, 0.005-2 weight % $Fe_2O_3$, and 0-5 weight % $K_2O$. The glass may also contain other additives, for example, refining agents, which would normally be present in an amount of up to 2%. In these embodiments, the glass substrate 12 may be a float glass ribbon. In embodiments where the glass substrate 12 is a portion of a float glass ribbon, the glass substrate 12 may be clear float glass. In some of these embodiments, clear float glass may mean a glass having a composition as defined in a related standard such as BS EN 572-1:2012+A1:2016 and BS EN 572-2:2012. However, the glass substrate 12 may be of another composition such as, for example, a borosilicate or aluminosilicate composition.

A coating 14 is formed over the glass substrate 12. The coating 14 is of the anti-reflective variety in that it enables the glass article 10 to exhibit a visible light reflection that is lower than the visible light reflection exhibited by the glass substrate 12 alone. Advantageously, the coating 14 is also configured to provide more visible light transmission through the glass article 10 than the known designs.

Preferably, the coating 14 is formed directly on a first major surface 16 of the glass substrate 12. When the coating 14 is formed directly on the glass substrate 12, there are no intervening coatings between the coating 14 and the glass substrate 12. A second major surface 18 of the glass substrate 12 and an opposite side of the glass article 10 may be uncoated. The coating 14 is anti-reflective because it enables the glass article 10 to exhibit a visible light reflection that is lower than the visible light reflection exhibited by the glass substrate 12. In an embodiment, the coating 14 is pyrolytic. As used herein, the term "pyrolytic" may refer to a coating or a layer thereof that is chemically bonded to the glass substrate or another layer. Preferably, the coating 14 is formed under dynamic deposition conditions. In these embodiments, the glass substrate 12 is moving at the time of forming the coating 14 thereon or thereover. Preferably, the glass substrate 12 moves at a predetermined rate of, for example, greater than 3.175 m/min (125 in/min) as the coating 14 is being formed. In an embodiment, the glass substrate 12 is moving at a rate of between 3.175 m/min (125 in/min) and 12.7 m/min (600 in/min) as the coating 14 is being formed. In these embodiments, one more of the coating layers 20-26 may be formed in conjunction with the manufacture of the glass substrate 12. Preferably, the glass substrate 12 is manufactured utilizing the well-known float glass manufacturing process.

The coating 14 comprises two or more layers, including anti-reflective layers 24 and 26. Preferably, the coating 14 comprises three or more layers, including a barrier layer 22 and anti-reflective layers 24 and 26. In some embodiments, the coating 14 comprises four or more layers, with layers 20 and 22 serving as an iridescence-suppressing interlayer between the glass substrate 12 and the anti-reflective layers 24 and 26. In an embodiment, the coating 14 may consist of four layers 20, 22, 24, and 26. In this embodiment, there are no intervening layers between the layers 20, 22, 24, 26 and there are no intervening layer(s) between the first layer 20 and the glass substrate 12.

Thus, in some embodiments, the coating 14 includes a first iridescence-suppressing layer 20 deposited over the glass substrate 12. More particularly, the layer 20 is deposited over the first major surface 16 of the glass substrate 12. In an embodiment, the layer 20 is deposited directly on the first major surface 16 of the glass substrate 12. When the layer 20 is deposited directly on the first major surface 16 of the glass substrate 12, there are no intervening layers between the layer 20 and the first major surface 16 of the glass substrate 12.

Preferably, the first iridescence-suppressing layer 20 has a refractive index that is 1.6 or more. In certain embodiments, the refractive index of the layer 20 is 1.8 or more. In one such embodiment, the refractive index of the layer 20 is between 1.8 and 2.0. In another embodiment, the refractive index of the layer 20 is between 2.1 and 2.5. It should be noted that the refractive index values described herein are reported as an average value across 400-780 nm of the electromagnetic spectrum.

Preferably, the first iridescence-suppressing layer 20 is pyrolytic. In certain embodiments, the layer 20 comprises an inorganic metal oxide. In some embodiments, the layer 20 comprises tin oxide ($SnO_2$). When the layer 20 comprises tin oxide, it is preferred that the layer 20 comprises tin and oxygen. However, in these embodiments, the layer 20 may also comprise other constituents including a trace amount or more of other elements such as, for example, carbon. As used herein, the phrase "trace amount" is an amount of a constituent of a coating layer that makes up less than 0.01 wt. % of the coating layer. In certain embodiments, the layer 20 may consist essentially of tin oxide. In other embodiments, the layer 20 may comprise niobium oxide ($Nb_2O_5$), titanium dioxide ($TiO_2$), tantalum oxide ($Ta_2O_5$), or another transparent metal oxide. Tin oxide, niobium oxide, titanium oxide, and tantalum oxide are preferred metal oxides because each has a relative high refractive index and electrical resistance. It should be noted that it is preferred that the electrical resistance of the layer 20 not be reduced by, for example, adding a dopant such as fluorine or another material to the layer 20. As such, it is preferred that the layer 20 is undoped.

The layer 20 has a thickness of 50 nanometers (nm) or less. Preferably, the thickness of the layer 20 is 30 nm or less. In certain embodiments, the thickness of the layer 20 is 5-25 nm.

A second iridescence-suppressing layer 22 may be deposited over, and preferably directly on, the first iridescence-suppressing layer 20. Thus, the layer 20 separates the layer 22 from the glass substrate 12. When the layer 22 is deposited directly on the layer 20, there are no intervening layers between the layer 20 and the layer 22. In certain embodiments, the layer 22 is pyrolytic.

Preferably, the layer 22 has a thickness of 50 nm or less. In some embodiments, the layer 22 has a thickness that is greater than a thickness of the layer 20. Preferably, the thickness of the layer 22 is 20-50 nm.

The second iridescence-suppressing layer 22 has a refractive index that is less than the refractive index of the layer 20. In some embodiments, the layer 22 has a refractive index that is 1.6 or less. In an embodiment, the refractive index of the layer 22 is between 1.2 and 1.6. In other embodiments, the refractive index of the layer 22 is between 1.2 and 1.5.

In certain embodiments, it is preferred that the layer 22 has relatively high electrical resistance. In these embodiments, it may be preferred that the second layer comprises an oxide of silicon. In one such embodiment, the layer 22 comprises silicon dioxide ($SiO_2$). In these embodiments, the layer 22 comprises silicon and oxygen. The layer 22 may also include a trace amount of one or more additional constituents such as, for example, carbon. Thus, in certain embodiments, the layer 22 may consist essentially of silicon dioxide. However, other materials that exhibit a relatively high electrical resistance and a desirable refractive index may be suitable for use in the second layer.

Thus, in certain embodiments, the layer 20 and the layer 22 form an iridescence-suppressing interlayer between the glass substrate 12 and the anti-reflective layers 24 and 26. The iridescence-suppressing interlayer is advantageous because it allows the glass article 10 to exhibit a neutral color in transmittance and reflectance. In this embodiment, it may be preferred that the thickness of the iridescence-suppressing interlayer formed by the layers 20 and 22 together be from about $\frac{1}{6}^{th}$ to about $\frac{1}{12}^{th}$ of a 500 nm design wavelength.

In other embodiments, where it is not particularly advantageous that the glass article 10 exhibit a neutral color in transmittance and reflectance, the iridescence-suppressing layers 20 and 22 may be omitted (not shown). In still other embodiments, the iridescence-suppressing layer 20 may be omitted, but the layer 22 may be included (not shown) to serve as a barrier layer between the glass substrate 12 and the first anti-reflective layer 24. In that case, the layer 22 would reduce the haze otherwise exhibited by the coated glass article 10.

The first anti-reflective layer 24 is deposited over the glass substrate 12 and, unless omitted, over the layer 22. In embodiments including the layer 22, the layer 24 is preferably deposited directly on the layer 22. In that case, the layer 22 separates the layer 24 from the layer 20. When the layer 24 is deposited directly on the layer 22, there are no intervening layers between the layer 24 and the layer 22. It is preferred that the layer 24 is pyrolytic.

Preferably, the first anti-reflective layer 24 has a refractive index of 1.6 or more. In certain embodiments, the refractive index of the layer 24 is 1.8 or more. In an embodiment, the refractive index of the layer 24 is between 1.8 and 2.0. In other embodiments, the refractive index of the layer 24 is 2.0 or more. In these embodiments, the refractive index of the layer 24 may be between 2.1 and 2.4.

In certain embodiments, the layer 24 comprises an inorganic metal oxide. In some embodiments, the layer 24 comprises tin oxide ($SnO_2$). Tin oxide is a preferred material because of its relatively high refractive index and electrical resistance. Other materials with desirable refractive indices and electrical resistance that are suitable for use in the layer 24 include niobium oxide ($Nb_2O_5$) and tantalum oxide ($Ta_2O_5$). Thus, in some embodiments, the layer 24 comprises niobium oxide or tantalum oxide. Other inorganic metal oxide materials may be suitable for use in the layer 24. Also, it is preferred that the electrical resistance of the layer 24 not be reduced by, for example, adding a dopant such as fluorine or another material to the layer 24. As such, it is preferred that the layer 24 is undoped.

The first anti-reflective layer 24 has a thickness of less than $\lambda/(4*n)$, where A equals a design wavelength in the visible spectrum and n equals the refractive index of the layer 24. Preferably, the design wavelength, $\lambda$, is generally selected at the center of the visible light region of the electromagnetic spectrum, or at 550 nm. It is preferred that the layer 24 have a refractive index of 1.6 or more. In certain embodiments, the refractive index of the layer 24 is 1.8 or more. In an embodiment, the refractive index of the layer 24 is between 1.8 and 2.0. In another embodiment, the refractive index of the layer 24 is between 2.1 and 2.4.

Under the conditions specified above, the first anti-reflective layer 24 will have a thickness of less than 70 nm. In an embodiment, the layer 24 has a thickness of 5-60 nm. Preferably, when the layer 24 comprises tin oxide, the layer 24 has a thickness of 20-60 nm. Even more preferably, when the layer 24 comprises tin oxide, it has a thickness of 20-40 nm. When the layer 24 comprises niobium oxide or tantalum oxide, it is preferred that the layer 24 has a thickness of 5-40 nm.

The second anti-reflective layer 26 is deposited over, and preferably, directly on, the first anti-reflective layer 24. When the layer 26 is deposited directly on the layer 24, there are no intervening layers between the layer 24 and the layer 26. In some embodiments, the layer 26 may be the outermost layer of the coating 14. When the layer 26 is the outermost layer of the coating 14, the layer 26 forms an outer surface 28 of the glass article 10.

In an embodiment, like the one illustrated in FIG. 1, the second anti-reflective layer 26 has a thickness that is greater than the thickness of the first anti-reflective layer 24. Preferably, the thickness of the layer 26 is 80 nm or more. In some embodiments, the thickness of the layer 26 is 80-125 nm. In one embodiment, the thickness of the layer 26 is 80-110 nm.

The second anti-reflective layer 26 has a refractive index that is less than the refractive index of the first anti-reflective layer 24. In some embodiments, the layer 26 has a refractive index that is 1.6 or less. In an embodiment, the refractive index of the layer 26 is between 1.2 and 1.6. In other embodiments, the refractive index of the layer 26 may be between 1.2 and 1.5.

In an embodiment, the second anti-reflective layer 26 comprises an oxide of silicon. Preferably, the layer 26 comprises silicon dioxide ($SiO_2$). In these embodiments, the layer 26 comprises silicon and oxygen. The layer 26 may also include a trace amount of one or more additional constituents such as, for example, carbon. Thus, in certain embodiments, the layer 26 may consist essentially of silicon dioxide. However, other materials that exhibit a relatively high electrical resistance and low refractive index may be suitable for use in the layer 26.

The embodiments described above provide a glass article 10 that exhibits anti-reflective properties. The reflectivity of the glass article 10 will be further discussed below with respect to its total visible light reflectance. For describing the glass article 10, total visible light reflectance will refer to the percentage of visible light reflected from the glass article 10 as measured from the side 30 of the glass article 10 that has the coating 14 formed on the surface of the glass substrate 12 (coated side). The total visible light reflectance will be described herein according to the CIELAB color scale system using Illuminant D65, ten degree observer and can be measured using a commercially available spectrophotometer such as the Perkin Elmer Lambda 950.

Advantageously, the glass article 10 exhibits a total visible light reflectance (Illuminant D65, ten degree observer) of less than 6.0%. Preferably, the glass article 10 exhibits a total visible light reflectance (Illuminant D65, ten degree observer) of 5.5% or less. In an embodiment, the glass article 10 may exhibit a total visible light reflectance (Illuminant D65, ten degree observer) of 4.0%-5.5%.

In other embodiments, the glass article 10 exhibits a total visible light reflectance (Illuminant D65, ten degree observer) of 5.0% or less. In one such embodiment, the glass article 10 may exhibit a total visible light reflectance (Illuminant D65, ten degree observer) of 4.0%-5.0%.

The glass article 10 may also exhibit a high visible light transmittance. The visible light transmittance of the glass article 10 will be further discussed below with respect to total visible light transmittance. As discussed herein, total visible light transmittance will refer to the percentage of visible light passing through the glass article 10 as measured from the coated side 30 of the glass article 10. The total visible light transmittance will be described herein according to the CIELAB color scale system using Illuminant D65, ten degree observer and can be measured using a commercially available spectrophotometer such as the Perkin Elmer Lambda 950. In an embodiment, the glass article 10 exhibits a total visible light transmittance (Illuminant D65, ten degree observer) of 90% or more. Preferably, the glass article 10 exhibits a total visible light transmittance (Illuminant D65, ten degree observer) of 92% or more, and more preferably of 94% or more.

The glass article 10 may also exhibit other properties that are advantageous. For example, when the layer 20 and the layer 22 are included as an iridescence-suppressing interlayer, the glass article 10 may exhibit a neutral color for the visible light reflected from the coated side 30 of the glass article 10 when viewed at a 90 degree angle incident to the glass article 10. The color of the visible light reflected from the coated side 30 of the glass article 10 may be referred to herein as "reflected color." The reflected color will be described herein according to the CIELAB color scale system using Illuminant D65, ten degree observer. Reflected color can be measured using a commercially available spectrophotometer such as the Perkin Elmer Lambda 950. Also, for the purpose of describing the embodiments of the glass article 10 disclosed herein, a neutral color for the visible light reflected from the coated side 30 of the glass article 10 has an a* value (Illuminant D65, ten degree observer) in the range of −6 to 6 and a b* value (Illuminant D65, ten degree observer) in the range of −6 to 6. Preferably, the glass article 10 exhibits a reflected color in a range from about −4 to 6 for the a* value (Illuminant D65, ten degree observer) and a range from about −3 to 3 for the b* value (Illuminant D65, ten degree observer).

Also, the glass article 10 may exhibit a low haze value, especially in embodiments that include the layer 22. As discussed herein, the term "haze" refers to the percentage of incident visible light that scatters when passing through the glass article 10. Also, as discussed herein, the haze exhibited by the glass article 10 is measured from the coated side 30 of the glass article 10. In an embodiment, the glass article 10 may exhibit haze of 0.5% or less. Preferably, the glass article 10 exhibits a haze of 0.4% or less. In some embodiments, the haze exhibited by the glass article 10 is 0.1-0.4%. The haze exhibited by the glass article 10 can be measured using a commercially available haze meter such as the BYK-Gardner haze-gard plus.

In certain embodiments, the glass article 10 may be utilized in a touch screen electronic device. The touch screen electronic device may be of the projected capacitive touch, optical, or the infrared variety. When the glass article 10 is utilized in a touch screen electronic device, the glass article 10 is provided in the device such that the coating 14 faces out from the device and, when the touch screen electronic device is in use, the user controls the device by touching the coating 14. In these embodiments, it is preferred that the glass article 10 exhibits a high sheet resistance. In one such embodiment, the glass article 10 exhibits a sheet resistance of, for example, greater than $1.0 \times 10^5$ ohm/sq. The glass article 10 exhibits a sheet resistance of, for example, greater than $1.0 \times 10^5$ ohm/sq. by proper selection of the composition and thickness of each of the layers 20-26. The sheet resistance exhibited by glass article 10 is measured on the coated side 30 of the glass article 10. The sheet resistance exhibited by glass article 10 can be measured using a 4-point probe method and a commercially available 4-point probe.

As discussed, above, the coating 14 may be formed in conjunction with the manufacture of the glass substrate 12 in the well-known float glass manufacturing process. The float glass manufacturing process is typically carried out utilizing a float glass installation such as the installation 32 depicted in the FIG. 3. However, it should be understood that the float glass installation 32 described herein is only illustrative of such installations.

As illustrated in FIG. 3, the float glass installation 32 may comprise a canal section 33 along which molten glass 34 is delivered from a melting furnace, to a float bath section 36 wherein the glass substrate is formed. In this embodiment, the glass substrate will be referred to as a glass ribbon 38. The glass ribbon 38 is a preferable substrate on which the coating is formed. However, it should be appreciated that the glass substrate is not limited to being a glass ribbon.

The glass ribbon 38 advances from the bath section 36 through an adjacent annealing lehr 40 and a cooling section 42. The float bath section 36 includes: a bottom section 44 within which a bath of molten tin 46 is contained, a roof 48, opposite side walls (not depicted) and end walls 50, 52. The roof 48, side walls and end walls 50, 52 together define an enclosure 54 in which a non-oxidizing atmosphere is maintained to prevent oxidation of the molten tin 46.

In operation, the molten glass 34 flows along the canal section 33 beneath a regulating tweel 56 and downwardly onto the surface of the tin bath 46 in controlled amounts. On the molten tin surface, the molten glass 34 spreads laterally under the influence of gravity and surface tension, as well as certain mechanical influences, and it is advanced across the tin bath 46 to form the glass ribbon 38. The glass ribbon 38 is removed from the bath section 36 over lift out rolls 58 and is thereafter conveyed through the annealing lehr 40 and the cooling section 42 on aligned rolls. The deposition of the coating 14 preferably takes place in the float bath section 36, although it may be possible for deposition to take place further along the glass production line, for example, in the gap 60 between the float bath 36 and the annealing lehr 40, or in the annealing lehr 40.

Figure 2:
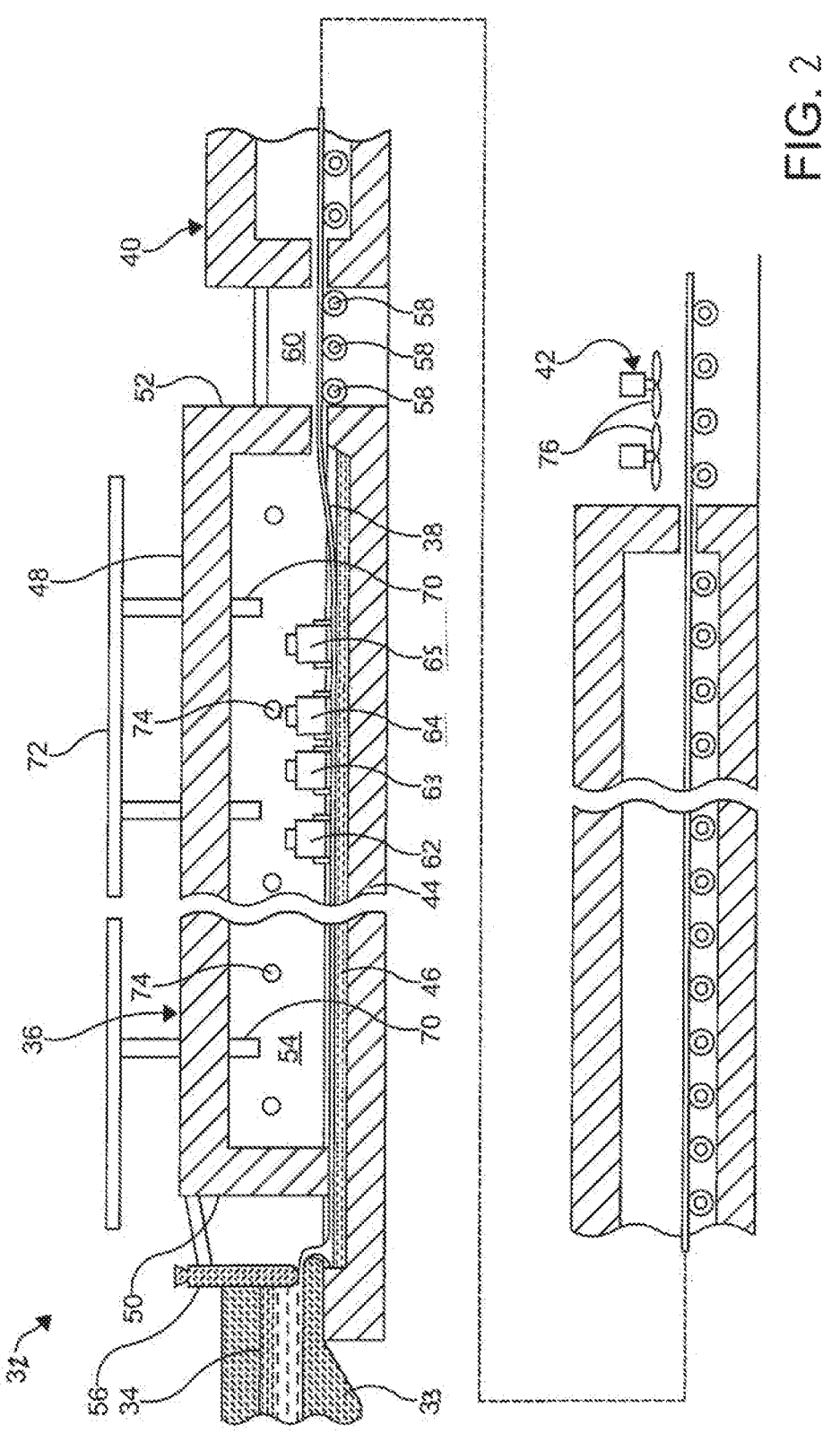
FIG. 2 is a schematic view, in vertical section, of an installation for practicing the float glass manufacturing process in accordance with an embodiment of the invention.

As illustrated in the FIG. 2, two coating apparatuses 62, 64 are shown within the float bath section 36. The coating 14 may be formed utilizing the coating apparatuses 62, 63, 64, 65 with each coating apparatuses utilized to deposit one of the coating layers 20-26. For example, in an embodiment, the layer 20 is deposited utilizing the first coating apparatus 62, the layer 22 is deposited utilizing the second coating apparatus 63, the layer 24 is deposited utilizing the third coating apparatus 64, and the layer 26 is deposited utilizing the fourth coating apparatus 65.

A suitable non-oxidizing atmosphere, generally nitrogen or a mixture of nitrogen and hydrogen in which nitrogen predominates, is maintained in the float bath section 36 to prevent oxidation of the molten tin 46 comprising the float bath. The atmosphere gas is admitted through conduits 70 operably coupled to a distribution manifold 72. The non-oxidizing gas is introduced at a rate sufficient to compensate for normal losses and maintain a slight positive pressure, on the order of between about 0.001 and about 0.01 atmosphere above ambient atmospheric pressure, so as to prevent infiltration of outside atmosphere. For purposes of the describing the invention, the above-noted pressure range is considered to constitute normal atmospheric pressure.

Preferably, the coating 14 is formed at essentially atmospheric pressure. Thus, the pressure of the float bath section 36, annealing lehr 40, and/or in the gap 60 between the float bath 36 and the annealing lehr 40 may be essentially atmospheric pressure.

Heat for maintaining the desired temperature regime in the float bath section 36 and the enclosure 54 is provided by radiant heaters 74 within the enclosure 54. The atmosphere within the lehr 40 is typically atmospheric air, as the cooling section 42 is not enclosed and the glass ribbon 38 is therefore open to the ambient atmosphere. The glass ribbon 38 is subsequently allowed to cool to ambient temperature. To cool the glass ribbon 38, ambient air may be directed against the glass ribbon 38 as by fans 76 in the cooling section 42. Heaters (not depicted) may also be provided within the annealing lehr 40 for causing the temperature of the glass ribbon 38 to be gradually reduced in accordance with a predetermined regime as it is conveyed therethrough.

EXAMPLES

The following examples are presented solely for the purpose of further illustrating and disclosing the embodiments of the glass article.

Examples of glass articles within the scope of the invention are described below and illustrated in TABLEs 1 and 2. In TABLE 1, the glass article within the scope of the invention is Ex 1. A comparative example, C1, and not considered to be a part of the invention is also described below and illustrated in TABLE 1. Examples Ex 1 and C1 were modelled and the properties exhibited by each are predictive.

The following conditions are applicable to the glass articles of Ex 1 and C1. The glass articles of Ex 1 and C1 each include a glass substrate. The glass substrate is of a soda-lime-silica composition and has a thickness of 6 millimeters (mm). A coating is provided on a first major surface of each glass substrate. Each coating includes a first layer, second layer, third layer, and fourth layer.

For C1, the first layer is directly on the first major surface of the glass substrate. The first layer comprises tin oxide and has a thickness of 15 nm. The second layer is directly on the first layer. The second layer comprises silicon dioxide and has a thickness of 27 nm. The third layer is directly on the second layer. The third layer comprises tin oxide ($SnO_2$) and has a thickness of 130 nm. The fourth layer is directly on the third layer. The fourth layer comprises silicon dioxide and has a thickness of 85 nm. Thus, the glass article of C1 is of a glass/$SnO_2$/$SiO_2$/$SnO_2$/$SiO_2$ arrangement.

For Ex 1, the first layer is directly on the first major surface of the glass substrate. The first layer comprises tin oxide and has a thickness of 15 nm. The second layer is directly on the first layer. The second layer comprises silicon dioxide and has a thickness of 27 nm. The third layer is directly on the second layer. The third layer comprises undoped tin oxide ($SnO_2$) and has a thickness of 30 nm. The fourth layer is directly on the third layer. The fourth layer comprises silicon dioxide and has a thickness of 85 nm. Thus, the glass article of Ex 1 is of a glass/$SnO_2$/$SiO_2$/$SnO_2$/$SiO_2$ arrangement.

The total visible light transmittance (Tvis) (Illuminant D65, ten degree observer) and total visible light reflectance (Rf) (Illuminant D65, ten degree observer) and reflected color (Ra*, Rb*) (Illuminant D65, ten degree observer) of the glass articles of Ex 1 and 01 are reported in TABLE 1. The total visible light transmittance and the total visible light reflectance are expressed as percentages.

TABLE 1

| Examples | Tvis | Rf | Ra* | Rb* |
|---|---|---|---|---|
| C1 | 91.1 | 4.9 | −3.25 | 1.96 |
| Ex 1 | 92.1 | 4.8 | −0.96 | −1.40 |

As shown in TABLE 1, the glass article of Ex 1 exhibits improved reflectance and transmittance properties when compared with the glass article of C1. It should also be noted that the glass article of Ex 1 exhibited a neutral color for the visible light reflected from the coated side of the glass article.

In TABLE 2, the glass article within the scope of the invention is Ex 2. A comparative example, C2, and not considered to be a part of the invention is also described below and illustrated in TABLE 2.

The following experimental conditions are applicable to Ex 2 and C2. A coating was deposited on a first major surface of a glass substrate as the glass substrate was being formed and moving in conjunction with the float glass manufacturing process. Each glass substrate was of a soda-lime-silica composition and a thickness of 3.2 mm.

For Ex 2 and C2 the coating was formed by depositing a first layer, second layer, third layer, and fourth layer. Each layer was pyrolytic and formed by utilizing an APCVD process.

For C2, the first layer is directly on the first major surface of the glass substrate. The first layer comprises tin oxide and has a thickness of 12 nm. The second layer is directly on the first layer. The second layer comprises silicon dioxide and has a thickness of 25 nm. The third layer is directly on the second layer. The third layer comprises fluorine doped tin oxide ($SnO_2$:F) and has a thickness of 130 nm. The fourth layer is directly on the third layer. The fourth layer comprises silicon dioxide and has a thickness of 85 nm. Thus, the glass article of C2 is of a glass/$SnO_2$/$SiO_2$/$SnO_2$:F/$SiO_2$ arrangement.

For Ex 2, the first layer is directly on the first major surface of the glass substrate. The first layer comprises tin oxide and has a thickness of 12 nm. The second layer is directly on the first layer. The second layer comprises silicon dioxide and has a thickness of 25 nm. The third layer is directly on the second layer. The third layer comprises undoped tin oxide ($SnO_2$) and has a thickness of 30 nm. The fourth layer is directly on the third layer. The fourth layer comprises silicon dioxide and has a thickness of 85 nm. Thus, the glass article of Ex 2 is of a glass/$SnO_2$/$SiO_2$/$SnO_2$/$SiO_2$ arrangement.

The total visible light transmittance (Tvis) (Illuminant D65, ten degree observer), total visible light reflectance (Rf) (Illuminant D65, ten degree observer) and reflected color (Ra*, Rb*) (Illuminant D65, ten degree observer) of the glass articles of Ex 2 and C2 are reported in TABLE 2. The total visible light transmittance and was measured on the coated side of each glass article using a Perkin Elmer Lambda 950 spectrophotometer and is expressed as a percentage. The total visible light reflectance and reflected color were also measured on the coated side of each glass article using a Perkin Elmer Lambda 950 spectrophotometer. The total visible light reflectance is expressed as a percentage.

TABLE 2

| Examples | Tvis | Rf | Ra* | Rb* |
|---|---|---|---|---|
| C2 | 92.3 | 5.2 | −1.44 | −0.99 |
| Ex 2 | 94.3 | 5.5 | 5.32 | −0.75 |

As shown in TABLE 2, the glass article of Ex 2 exhibits about the same total visible light reflectance as the glass article of C2. However, the glass article of Ex 2 exhibits 2% more total visible light transmittance than the glass article of C2. Also, the glass article of Ex 2 exhibited a neutral color for the visible light reflected from the coated side of the glass article.

Additional examples Ex 3 to Ex 13 are described below and illustrated in TABLE 3 in which the first iridescence-suppressing layer has been omitted and the second layer serves as a barrier layer. The examples Ex 1 to Ex 13 were modelled and the properties exhibited by each are predictive.

The glass article for each of Ex 3 to Ex 13 is of a glass/$SiO_2$/$SnO_2$/$SiO_2$ arrangement. The glass substrate is of a soda-lime-silica composition and has a thickness of 6 millimeters (mm). The coating layer thicknesses in nm and properties are reported in TABLE 3.

TABLE 3

| Ex # | $SiO_2$ | $SnO_2$ | $SiO_2$ | Tvis | Rf | Ra* | Rb* |
|---|---|---|---|---|---|---|---|
| 3 | 15 | 20 | 120 | 94.2 | 5.4 | 3.9 | −4.5 |
| 4 | 15 | 22 | 120 | 94.3 | 5.3 | 4.5 | −5.7 |
| 5 | 15 | 24 | 120 | 94.4 | 5.2 | 5.1 | −7.0 |
| 6 | 15 | 26 | 120 | 94.5 | 5.1 | 5.7 | −8.5 |
| 7 | 15 | 28 | 120 | 94.5 | 5.1 | 6.2 | −10.0 |
| 8 | 15 | 30 | 120 | 94.5 | 5.0 | 6.6 | −11.6 |
| 9 | 15 | 32 | 120 | 94.5 | 5.0 | 7.0 | −13.2 |
| 10 | 15 | 34 | 120 | 94.5 | 5.0 | 7.3 | −14.7 |
| 11 | 15 | 36 | 120 | 94.5 | 5.0 | 7.5 | −16.2 |
| 12 | 15 | 38 | 120 | 94.4 | 5.1 | 7.6 | −17.6 |
| 13 | 15 | 40 | 120 | 94.3 | 5.2 | 7.6 | −18.9 |

As shown in TABLE 3, the glass articles of Ex 3 through Ex 13 exhibit improved reflectance and transmittance properties when compared with the glass article of C1, and improved transmittance properties when compared with the glass article of C2. However, the glass articles of Ex 3 through Ex 13 exhibited a color for the visible light reflected from the coated side of the glass article that was less neutral as compared with that of Ex 1 and Ex 2.

Further, the modeled Ex 3 through Ex 13 may be modified by eliminating the SiO2 barrier layer, resulting in a glass articles of a glass/SiO$_2$/SnO$_2$/SiO$_2$ arrangement. In that case, the predicted properties shown in Table 3 would be the same for each example, though the haze exhibited by the examples so modified would be increased from that exhibited by the examples that include the barrier layer.

The foregoing description is considered as illustrative only of the principles of the invention. Further, since numerous modifications and changes will readily occur to those skilled in the art, it is not desired to limit the invention to the exact construction and processes shown and described herein. Accordingly, all suitable modifications and equivalents may be considered as falling within the scope of the invention as defined by the claim, which follows.

The invention claimed is:

1. A glass article comprising a glass substrate and a coating formed over the glass substrate, wherein the coating comprises:

a first anti-reflective layer deposited over the glass substrate, wherein the first layer comprises undoped tin oxide and has a thickness of less than λ/(4*n), where λ equals 550 nm, n equals the refractive index of the first anti-reflective layer, and n is 1.6 or more;

a second anti-reflective layer deposited over the first anti-reflective layer, the second anti-reflective layer having a thickness that is greater than the thickness of the first anti-reflective layer and a refractive index that is less than the refractive index of the first anti-reflective layer; and an iridescence-suppressing interlayer between the glass substrate and the first anti-reflective layer;

wherein the iridescence-suppressing interlayer comprises a first iridescence-suppressing layer having a refractive index of 1.6 or more and a second iridescence-suppressing layer deposited over the first iridescence-suppressing layer, the second iridescence-suppressing layer having a refractive index that is less than the refractive index of the first iridescence-suppressing layer; and wherein the glass article exhibits a total visible light reflectance of less than 6.0%.

2. The glass article of claim 1, wherein the glass article exhibits a total visible light reflectance of 5.5% or less and/or wherein the glass article exhibits a neutral reflected color.

3. The glass article of claim 1, wherein the refractive index of the first anti-reflective layer is 2.0 or more.

4. The glass article of claim 1, wherein the thickness of the first anti-reflective layer is less than 70 nm and/or wherein the thickness of the first anti-reflective layer is between 20 nm or more and 60 nm or less.

5. The glass article of claim 1, wherein the first anti-reflective layer comprises tin oxide and has a thickness of between 20 or more and 50 nm or less.

6. The glass article of claim 1, wherein the second anti-reflective layer has a thickness of 80 nm or more.

7. The glass article of claim 1, wherein the refractive index of the second anti-reflective layer is 1.6 or less.

8. The glass article of claim 1, wherein the second anti-reflective layer comprises silicon dioxide and/or wherein the second anti-reflective layer is the outermost layer of the glass article.

9. The glass article of claim 1, wherein the first iridescence-suppressing layer comprises tin oxide and/or wherein the first iridescence-suppressing layer has a thickness of between 5 nm or more and 25 nm or less.

10. The glass article of claim 1, wherein the second iridescence-suppressing layer is deposited directly on the first iridescence-suppressing layer and/or wherein the second iridescence-suppressing layer has a thickness of 5 nm or more and 25 nm or less.

11. The glass article of claim 1, wherein the second iridescence-suppressing layer comprises silicon dioxide and/or wherein the first anti-reflective layer is deposited directly on the second iridescence-suppressing layer.

12. The glass article of claim 1, wherein the coating consists of the first iridescence-suppressing layer, the iridescence-suppressing second layer, the first anti-reflective layer, and the second anti-reflective layer.

13. The glass article of claim 1, wherein the glass article exhibits a total visible light reflectance of from 4.0% to 5.5%.

14. The glass article of claim 1, wherein the refractive index of the first anti-reflective layer is between 2.1 and 2.5.

15. The glass article of claim 1, wherein the second anti-reflective layer has a thickness of 80 nm or more and 125 nm or less.

16. The glass article of claim 1, wherein the second anti-reflective layer has a thickness of 80 nm or more and 110 nm or less.

17. The glass article of claim 1, wherein the refractive index of the second anti-reflective layer is from 1.2 to 1.5.

18. The glass article of claim 1, wherein the glass article exhibits a sheet resistance of greater than $1.0 \times 10^5$ ohm/sq.

19. The glass article of claim 1, wherein the thickness of the second anti-reflective layer is in the range of 80 nm to 95 nm.

20. The glass article of claim 1, wherein the thickness of the second anti-reflective layer is in the range of 80 nm to 90 nm.

21. A touch screen electronic device comprising the glass article of claim 1.

* * * * *